United States Patent [19]
Liao et al.

[11] Patent Number: 5,039,315
[45] Date of Patent: Aug. 13, 1991

[54] METHOD AND APPARATUS FOR SEPARATING PARTICULATES FROM A GAS STREAM

[75] Inventors: Chung F. Liao, Kingwood, Tex.; George W. Graham, Wilkinson, W. Va.

[73] Assignee: Marrowbone Development Company, Naugatuck, W. Va.

[21] Appl. No.: 479,775

[22] Filed: Feb. 14, 1990

[51] Int. Cl.⁵ ............................................. B01D 47/00
[52] U.S. Cl. .................................... 55/90; 55/259; 55/263; 261/116
[58] Field of Search ............... 55/80, 84, 90, 83, 93, 55/94, 257.2, 259, 263; 261/116

[56] References Cited
U.S. PATENT DOCUMENTS

| | | | |
|---|---|---|---|
| 1,377,594 | 5/1921 | Lissauer | 261/118 |
| 2,186,125 | 1/1940 | Roberts | 261/118 |
| 2,579,282 | 12/1951 | Vicard | 55/94 |
| 3,957,464 | 5/1976 | Teller | 55/94 |
| 4,345,916 | 8/1982 | Richards et al. | 55/83 |
| 4,374,813 | 2/1983 | Chen et al. | 55/90 |
| 4,401,444 | 8/1983 | Teller | 55/226 |
| 4,416,861 | 11/1983 | deVries | 55/94 |
| 4,487,615 | 12/1984 | Taylor et al. | 55/84 |
| 4,810,268 | 3/1989 | Chambers et al. | 261/118 |

Primary Examiner—Bernard Nozick

[57] ABSTRACT

A method and apparatus for separating particulate pollutants having a size range from submicrons to several tens of microns from a gas stream. The invention utilizes micron sized liquid particles or mists to remove the particles from the gas stream. The apparatus includes twin fluid atomizers to produce the micron sized particles and a corrugated plate interceptor to remove the liquid and entrain particulate pollutants from the gas stream.

5 Claims, 1 Drawing Sheet

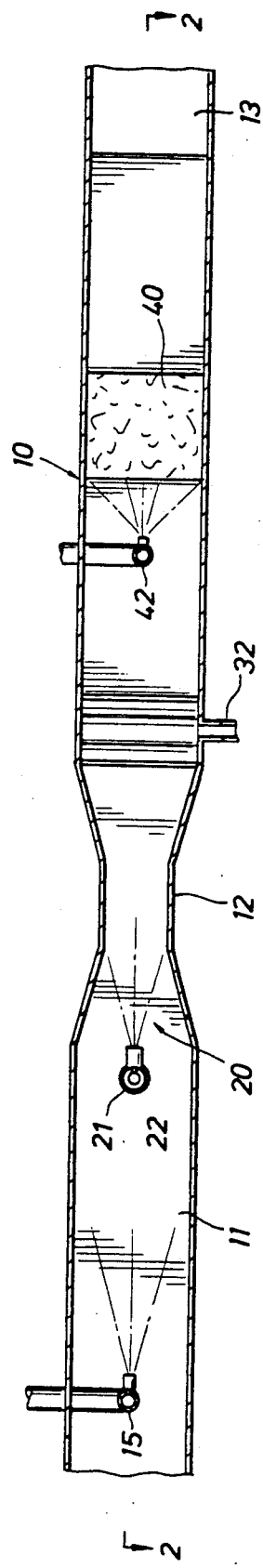
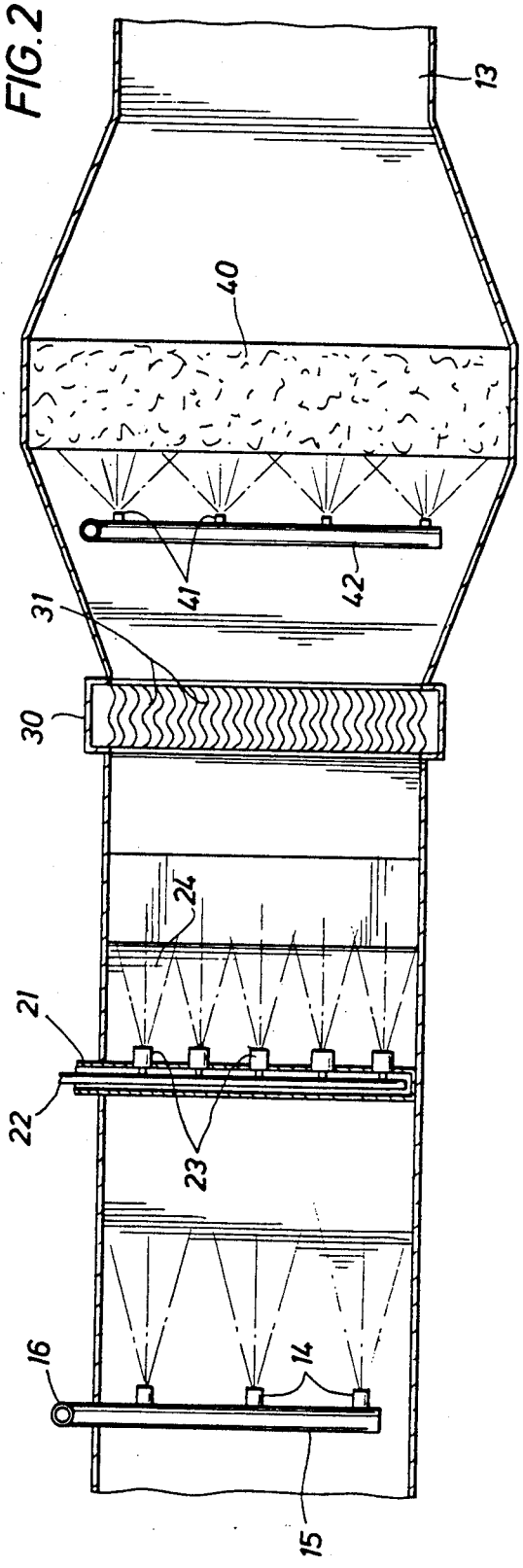

METHOD AND APPARATUS FOR SEPARATING PARTICULATES FROM A GAS STREAM

BACKGROUND OF THE INVENTION

The present invention relates to systems designed to remove pollutants from the air including both particulates and gaseous contaminants. In many industrial operations a considerable quantity of contaminants are produced which must be removed from the air before it can be discharged to the atmosphere. This is particularly true in the case of mining operations where considerable dust is produced in the form of very small particulate matter.

In the past, it has been the practice to use wet scrubbers for removing the particulate matter from the air because of their low capital cost and their ability to remove both the particulate and gaseous contaminants. While wet scrubbers are in wide use, they have a major drawback in that their operation requires considerable energy. The conventional wet scrubber consists of pressure nozzles that produce droplets in the size range of several hundred microns that are ineffective in capturing the respirable-size particulates contained in normal contaminants. It has been the customary practice to use a venturi section in a duct to create sufficient velocity of air flow to break up the large droplets in the scrubbing liquid into small droplets in the range of from 5 to 100 microns. While the use of a venturi section effectively breaks up the large droplets to provide the 5 to 100 micron size droplets required for removing respirable-size particles from the air, it is a very inefficient means for producing the required droplet size. This inefficiency results in an increased cost of operation of the system. The pressure differential over the scrubber length for a conventional wet scrubber is 10 to 100 inches of water column while the pressure differential for the device of the present invention is 5 to 10 inches of water column. From this comparison it is seen that the major energy consumption is in scrubber water atomization.

Another drawback of using wet scrubbers is freezing of the scrubbing water during severe cold weather. Small drops can be quickly frozen as they encounter the cold air, rendering them ineffective in capturing the dust particles. Therefore, wet scrubbers are rarely used in cold regions.

Another method that is in common use for removing particulate matter from air streams is the conventional baghouse in which cloth filters are used to remove the particulate matter from the flowing air stream. While the baghouse is an effective means for removing the respirable size particles from the air stream, it is expensive to install and requires considerable maintenance during operation. The air flow must be reversed periodically to remove the particulate matter which is collected on the individual filters to maintain the air flow through the baghouse. Likewise, provisions must be provided for periodically removing the particulate matter which is collected in the baghouse. This can involve the expenditure of considerable money and time. In order to perform the various maintenance functions on the baghouse, it is necessary to shut down the baghouse temporarily while the maintenance is being performed. If it is desired to maintain continuous operation, this necessitates the installation of sufficient baghouses so that operations can be maintained while a certain percentage of the baghouses are shut down for routine maintenance.

In many installations, the particulate matter filling the baghouse can form an explosive mixture. This is especially true in the case of coal dust or dust from food grains.

SUMMARY OF THE INVENTION

The present invention solves the above problems by utilizing steam injection followed by twin fluid atomizers in a wet scrubber. To increase removal efficiency and prevent freezing, steam is injected at the inlet of the wet scrubber. Steam injection provides a heating source to prevent the water droplets freezing under severe cold weather conditions and in addition, the condensed steam enlarges particle size ranging from submicron to 5 microns for more efficient separation. Particles in the size range from submicron to 5 micron are the most difficult to separate. Condensation of steam on the surface of the particles thus enhances the particle removal efficiency. The use of twin fluid atomizers will produce a mist having a droplet size in the range of 5 to 100 microns which is required for capturing respirable size particulate matter contained in an air stream. The ability to winterproof the device of the present invention allows it to be used in locations where baghouses are the only choice.

The present invention minimizes the possibility of explosion by contacting the respirable size particles with a significant concentration of water to render the particles non-explosive. The system is designed so that the total air flow is forced through the condensed steam containing fine particulates and the mist produced by the atomizers to remove substantially all the particulate matter from the air stream. This is accomplished by providing a reduced cross sectional area in the duct work of the system so that the mist can completely fill the cross sectional area of the duct work and thus force all the air to flow through the mist.

The air flow, after passing through the mist, passes through a corrugated plate interceptor where the liquid containing the particulate matter is removed. The liquid removed by the corrugated plate interceptor flows out of the interceptor and can be removed from the duct work on a continuous basis. Thus, the system will operate continuously and will not require routine maintenance such as that required with baghouses. In addition, the system requires less energy to operate than a wet scrubber.

The use of twin fluid atomizers to produce a mist having droplets of the correct size saves the energy required to force the air flow through the venturi section in a wet scrubber. While the use of the venturi section reduces the size of the droplets in a wet scrubber, it does not provide the uniform small droplet size produced by twin fluid atomizers. Thus, the removal efficiency of a wet scrubber is much less than the removal efficiency of the scrubber of the present invention.

BRIEF DESCRIPTION OF THE DRAWINGS

The invention will be more easily understood from the following description when taken in conjunction with the attached drawings in which:

FIG. 1 is an elevation view of a system constructed according to this invention shown partially in section.

FIG. 2 is a cross section taken along line 2—2 of FIG. 1.

DESCRIPTION OF PREFERRED EMBODIMENT

Referring now to FIGS. 1 and 2, there is shown a duct work 10 for conveying the dust-laden air through the system of the invention. Obviously, the duct work in the system must be designed to accommodate the total airflow of the system. When extremely large volumes of air must be handled, it will be more economical to provide parallel scrubbers instead of a single extremely large system. The duct work is provided with an inlet 11, a reduced cross sectional area 12 and a discharge outlet 13. The reduced cross sectional area 12 has the characteristics of a venturi but its purpose is to reduce the cross sectional area of the air flow and decrease the quantity of mist required to fill the complete cross section of the duct work. Since the required quantity of mist is reduced, the number of twin fluid atomizers and the required volume of liquid will also be reduced.

A series of steam jets 14 are mounted on a manifold 15 disposed at the inlet 11 of the duct work. The manifold is connected to a source of dry steam by the line 16. The steam jets heat the particulate-laden air to a temperature above freezing to prevent freezing of the water mist introduced by the twin fluid atomizers. The steam, in addition, improves the efficiency of the scrubber by condensing on the particles and increasing their size. The larger size particles are easier to remove from the air stream and the efficiency of the scrubber is improved. While the use of dry steam is preferred, wet steam can also be used.

The invention utilizes a series of twin fluid atomizers 23 which are mounted on a manifold 21. The manifold 21 is provided with a central tube 22 which supplies one of the fluids to the atomizer while the annular space surrounding the tube 22 can be used for supplying the second fluid to the atomizers. In most installations, it will be preferable to use water as the liquid and compressed air as the second fluid for atomizing the liquid. While these two fluids are preferred, other fluids can be used when it is desired to remove other contaminants from an air stream.

As shown in the drawings the atomizers are positioned so that their discharge will completely fill the width and height of the reduced cross sectional area 12 of the duct work. While only a single row of atomizers are shown, obviously more than one row may be used for larger size duct work. The reduced cross sectional area 12 discharges into a parallel plate interceptor 30. In particular, the interceptor shown is a corrugated plate interceptor which contains a large number of parallel corrugated plates 31. The air flow in passing through the corrugated plates will cause the liquid containing the particulate matter to impinge on the plates and be removed from the air flow. The liquid and particulate matter will flow by gravity to the bottom of the interceptor. The liquid and particulate matter can then be removed from the interceptor through a drain 32 to a disposal location.

In addition, a mesh or screen or fine filter 40 can be added to the tail end of the scrubber as necessary. This could be water washed by a series of water jets 41 mounted on a manifold 42. The water jets can be controlled by a timer or by a pressure differential switch (not shown).

In some mining operations, it may be feasible to add the liquid containing the particulates removed from the air stream by the parallel plate interceptor 30 directly back to the mined coal. This is particularly feasible in cases where the coal is crushed and the system is used for removing the dust created in the crushing and transporting operations before the air is discharged to the atmosphere.

If it is not feasible to add the liquid containing the particulates to the coal stream, it can be disposed of in suitable settling basins where the particulate matter will settle out and can be removed.

The slurry could also be pumped away to a remote location without allowing for settling.

The present invention provides a highly efficient system for removing respirable particles from an air stream before it is discharged to the atmosphere. The term 'respirable' is used to describe particulates in the size of submicron to 15 microns. To remove this size particle of particulate from an air stream it is necessary that the liquid mist have a droplet size in the range of 5 to 100 microns. In a particular installation handling 6000 cubic feet per minute of dust laden air, the inlet had a cross section of 12 by 36 inches. The required mist was produced by using five twin-fluid atomizers having a flow rate of 3 gallons of water per minute and requiring 65 cubic feet of compressed air at a pressure of 45 psi. The reduced cross sectional area of the duct work had a cross section of 8 inches height and 36 inches width while the corrugated plate interceptor had a total cross sectional area of 4.4 square feet. This system was effective in removing more than 99.5% of the particulates in a range of 0.5 to 15 microns. This removal efficiency was obtained while having an air speed of 50 feet per second through the reduced cross sectional area of the duct work.

In contrast, a wet scrubber designed to provide the same removal efficiency of respirable particles would require ten times more power consumption than the use of a twin fluid atomizer. For a high energy scrubber (i.e., 100 in-Hw column pressure drop), the energy consumption is 15 HP/1000 actual cubic feet per minute or a total of 90 HP/6000 actual cubic feet per minute air flow. In contrast, the present invention requires only the power to supply 65 cubic feet per minute of compressed air at 45 psig, or approximately 7.2 HP. This assumes that the energy to move the air through the system and to supply the water is the same in both systems.

What is claimed is:

1. A method for separating respiratory size dust particles from an air stream, comprising:

directing the air stream containing the respiratory size dust particles along a confined path;

producing a water mist by using twin fluid atomizers wherein the drops forming the mist have a size range of between one and fifty microns, said mist being directed to cover the entire cross section of the confined path;

directing all of said air through a section of the confined path having a reduced cross section so that all of said air stream passes through said mist; and separating the water containing the dust particles from said air after said air has passed through said mist.

2. The method of claim 1 and in addition, injecting a heating medium into the air stream prior to directing the air stream through the water mist.

3. An apparatus for removing respiratory size particulate pollutants from a gas stream, comprising:

duct means disposed to form a confined flow path for said gas stream;

twin fluid atomizing means disposed in said duct means for producing a mist of liquid wherein the liquid drops have a size range between one and fifty microns, said atomizing means being directed so that the mist covers the entire cross section of the duct, said duct means having a reduced cross section downstream of said atomizing means for causing substantially all of said gas stream to pass through said mist; and means for separating said liquid containing the particulate pollutants from said gas stream prior to said gas stream's exit from said duct means.

4. The apparatus of claim 3 and in addition, at least one jet means positioned upstream of the atomizing means for injecting a heating medium into the gas stream.

5. The apparatus of claim 3 and in addition, a filter means positioned in the duct means downstream of the means for separating the liquid from the gas stream.

* * * * *